United States Patent
Kim et al.

(10) Patent No.: US 11,836,315 B2
(45) Date of Patent: Dec. 5, 2023

(54) ELECTRONIC DEVICE FOR IDENTIFYING TOUCH POSITION, TOUCH SYSTEM INCLUDING ELECTRONIC DEVICE, AND OPERATION METHOD THEREOF

(71) Applicant: Korea University Research and Business Foundation, Seoul (KR)

(72) Inventors: Chulwoo Kim, Seoul (KR); Soonsung Ahn, Paju-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/500,108

(22) Filed: Oct. 13, 2021

(65) Prior Publication Data

US 2022/0261132 A1   Aug. 18, 2022

(30) Foreign Application Priority Data

Feb. 17, 2021  (KR) .................. 10-2021-0020877
May 13, 2021   (KR) .................. 10-2021-0062243

(51) Int. Cl.
| | |
|---|---|
| G06F 3/041 | (2006.01) |
| G06F 3/046 | (2006.01) |
| G06F 3/044 | (2006.01) |
| G06F 3/0354 | (2013.01) |

(52) U.S. Cl.
CPC ...... *G06F 3/04162* (2019.05); *G06F 3/03545* (2013.01); *G06F 3/046* (2013.01); *G06F 3/0414* (2013.01); *G06F 3/0441* (2019.05); *G06F 3/0442* (2019.05); *G06F 3/04166* (2019.05)

(58) Field of Classification Search
CPC ............. G06F 3/04162; G06F 3/04166; G06F 3/0441; G06F 3/0442; G06F 3/03545; G06F 3/0414; G06F 3/046
See application file for complete search history.

(56) References Cited

U.S. PATENT DOCUMENTS

| | | | |
|---|---|---|---|
| 6,888,538 B2 | 5/2005 | Ely et al. | |
| 7,292,229 B2 | 11/2007 | Morag et al. | |
| 2013/0249871 A1* | 9/2013 | Yoo | ...................... G06F 3/03545 345/179 |
| 2014/0253470 A1* | 9/2014 | Havilio | .................. G06F 3/0488 345/173 |
| 2014/0306923 A1* | 10/2014 | Brillant | .................. G06F 3/0446 345/174 |
| 2019/0012017 A1* | 1/2019 | Kurasawa | ............ G09G 3/3696 |

FOREIGN PATENT DOCUMENTS

| | | |
|---|---|---|
| KR | 10-2004-0084503 A | 10/2004 |
| KR | 10-1083679 B1 | 11/2011 |
| KR | 10-2020-0045286 A | 5/2020 |

* cited by examiner

*Primary Examiner* — Stephen G Sherman
(74) *Attorney, Agent, or Firm* — NSIP Law (57) ABSTRACT

Disclosed is electronic device for identifying touch position, touch system including electronic device, and operation method thereof.

9 Claims, 10 Drawing Sheets

ELECTRONIC DEVICE FOR IDENTIFYING TOUCH POSITION, TOUCH SYSTEM INCLUDING ELECTRONIC DEVICE, AND OPERATION METHOD THEREOF

CROSS-REFERENCE TO RELATED APPLICATIONS

This application claims priority under 35 U.S.C. § 119 to Korean Patent Application No. 10-2021-0020877 filed on Feb. 17, 2021, and No. 10-2021-0062243 filed on May 13, 2021 in the Korean Intellectual Property Office, the disclosures of which are incorporated by reference herein in their entireties.

BACKGROUND

Embodiments of the inventive concept relate to an electronic device for identifying a touch position, a touch system including the electronic device, and an operation method thereof.

A digitizer is a sensor that senses the position, angle, and pressure of a pen when a stylus pen approaches, touches, or presses it. The digitizer is a sensor device widely used for mobile devices and electronic blackboards because it may replace a separate input device such as a keyboard and a mouse and be particularly useful for writing or sketching.

The digitizer is generally attached or integrated to various surfaces as a plate, and is mainly attached or integrated to a display panel for displaying an image in a mobile device. Because the digitizer is used as an auxiliary device of the touch sensor in a mobile device, a touch sensor and a digitizer are used respectively, or a digitizer function is added to the touch sensor device.

Meanwhile, there are styluses of an electro-magnetic resonance (EMR) type, an electrically coupled resonance (ECR) type, and the like. In a conventional EMR type stylus, after driving X-axis and Y-axis coils with a driving current, the voltage waveform of each coil is sensed in the EMR resonance section of the stylus. In the conventional EMR type stylus, the EMR resonance section is gradually attenuated and the sensitivity is lowered.

SUMMARY

Various examples of the inventive concept provide an electronic device for identifying a touch position that does not require a battery and has improved touch sensitivity by using a passive stylus, a touch system including the electronic device, and an operation method thereof.

It is to be understood that technical objects to be achieved by the inventive concept are not limited to the aforementioned technical objects and other technical objects which are not mentioned herein will be apparent from the following description to one of ordinary skill in the art to which the inventive concept pertains.

According to an exemplary embodiment, an electronic device includes a substrate, a first coil array sequentially arranged on the substrate in a first direction in a plan view, a second coil array spaced apart from the first coil array to be insulated and sequentially arranged in a second direction perpendicular or quasi-perpendicular to the first direction in the plan view, a driving circuit that applies a driving signal to one of the first coil array and the second coil array, a sensing circuit that senses a response signal corresponding to the driving signal from a remaining coil array, and a processor electrically connected to the driving circuit and the sensing circuit to control the driving circuit and the sensing circuit, wherein the processor performs (a) controlling the driving circuit to be connected to the one of the first coil array and the second coil array to apply the driving signal to the one of the first coil array and the second coil array, (b) controlling the sensing circuit to be connected to the remaining one of the first coil array and the second coil array to sense the response signal corresponding to the driving signal from the remaining coil array, and (c) identifying a contact position of a stylus based on the response signal.

The processor may perform operation (a) during a driving period, and operation (b) simultaneously with operation (a) during the driving period.

The first coil array may include a plurality of first coils, and the second coil array may include a plurality of second coils, wherein the processor may perform (d) controlling the driving circuit to be connected to at least one coil corresponding to the contact position among the plurality of first coils and the plurality of second coils and applying the driving signal, and (e) controlling the sensing circuit to be connected to the at least one coil, and sensing the response signal from the at least one coil to identify a resonant frequency of the stylus.

The processor may perform the operation (d) and the operation (e) during a resonance period positioned after a driving period in a time domain.

The processor may apply the driving signal to each of the plurality of coils included in one coil array at different times, and identify, as the contact position, at least one of a plurality of points corresponding to the plurality of coils included in the remaining one coil array and the plurality of coils included in the one coil array, based on the different time points.

The electronic device may further include a display substrate provided on the first coil array and the second coil array and including a display area, and a cover film provided on the display substrate to be in contact with the stylus.

According to another exemplary embodiment, a touch system includes a stylus, and an electronic device that identifies a contact position of the stylus, wherein the electronic device includes a substrate, a first coil array sequentially arranged on the substrate in a first direction in a plan view, a second coil array spaced apart from the first coil array to be insulated and sequentially arranged in a second direction perpendicular or quasi-perpendicular to the first direction in the plan view, a driving circuit that applies a driving signal to one of the first coil array and the second coil array, a sensing circuit that senses a response signal corresponding to the driving signal from a remaining one of the first coil array and the second coil array, and a processor electrically connected to the driving circuit and the sensing circuit to control the driving circuit and the sensing circuit, wherein the processor may perform (a) controlling the driving circuit to be connected to one of the first coil array and the second coil array to apply the driving signal to the one of the first coil array and the second coil array, (b) controlling the sensing circuit to be connected to the remaining one of the first coil array and the second coil array to sense the response signal corresponding to the driving signal from a remaining coil array; and (c) identifying the contact position based on the response signal.

According to still another exemplary embodiment, a method, which is performed by an electronic device including a substrate, a first coil array, a second coil array, a driving circuit, a sensing circuit, and a processor, includes (a) controlling, by the processor, the driving circuit to be connected to one of the first coil array and the second coil array and applying a driving signal to the one coil array, (b) controlling, by the processor, the sensing circuit to be connected to a remaining coil array of the first coil array and the second coil array to sense a response signal corresponding to the driving signal from the remaining coil array, and (c) identifying, by the processor, a contact position of a stylus based on the response signal.

The operation (a) may be performed during a driving period, and the operation (b) may be performed simultaneously with the operation (a).

The method may further include (d) controlling, by the processor, the driving circuit to be connected to at least one coil corresponding to the contact position among a plurality of first coils included in the first coil array and a plurality of second coils included in the second coil array, and applying the driving signal, and (e) controlling, by the processor, the sensing circuit to be connected to the at least one coil, and sensing the response signal from the at least one coil to identify a resonant frequency of the stylus.

The operation (d) and the operation (e) may be performed during a resonance period after a driving period in a time domain.

The various examples of the inventive concept described above are only some of the preferred examples of the inventive concept, and various examples in which the technical features of various examples of the inventive concept are reflected may be derived and understood by those of ordinary skill in the art, based on the detailed description to be given.

BRIEF DESCRIPTION OF THE FIGURES

The accompanying drawings, which are included to provide a further understanding of the inventive concept, illustrate embodiments of the inventive concept and together with the description serve to explain the principle of the inventive concept. The technical features of the inventive concept are not limited to a specific drawing, and some of the features illustrated in the respective drawings may be combined to constitute a new embodiment. The reference numerals in the drawings represent structural elements. In the drawings.

DETAILED DESCRIPTION

Hereinafter, embodiments of the inventive concept will be described in detail with reference to the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the inventive concept. However, it will be apparent to those skilled in the art that these teachings may be implemented and practiced without these specific details.

In some instances, well-known structures and devices are omitted in order to avoid obscuring the inventive concept and the important functions of the structures and devices are shown in block diagram form. The same reference numbers will be used throughout the description to refer to the same or like parts.

Because various examples according to the inventive concept may have various changes and may have various forms, various examples are illustrated in the drawings and described in detail in the inventive concept. However, this is not intended to limit various examples according to the inventive concept to specific disclosed forms, and includes changes, equivalents, or substitutes included in the spirit and scope of the inventive concept.

The terms first, second, etc. may be used to describe various elements, but the elements should not be limited by the terms. The terms may be used only for the purpose of distinguishing one component from another component without departing from the scope of the right according to the concept of the inventive concept, for example, a first component may be referred to as a second component. Similarly, the second component may also be referred to as a first component.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Expressions that describe the relationship between components, such as "between" and "between" or "neighboring" and "directly adjacent to" should be interpreted as well.

In various examples of the inventive concept, "I" and "," should be construed as indicating "and/or". For example, "A/B" may mean "A and/or B". Furthermore, "A, B" may mean "A and/or B". Furthermore, "A/B/C" may mean "at least one of A, B and/or C". Furthermore, "A, B and C" may mean "at least one of A, B and/or C".

In various examples of the inventive concept, "or" should be construed as indicating "and/or". For example, "A or B" may include "only A", "only B", and/or "both A and B". In other words, "or" should be construed as indicating "additionally or alternatively".

Terms used in this disclosure are used to describe specified examples of the inventive concept and are not intended to limit the scope of the inventive concept. The terms of a singular form may include plural forms unless otherwise specified. In the inventive concept, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In addition, unless defined otherwise, all terms used herein, including technical or scientific terms, have the same meanings as those generally understood by those skilled in the art to which the inventive concept pertains. The terms defined in the generally used dictionaries should be construed as having the meanings that coincide with the meanings of the contexts of the related technologies, and should not be construed as ideal or excessively formal meanings unless clearly defined in the specification of the inventive concept. Hereinafter, various examples of the inventive concept will be described in detail with reference to the accompanying drawings.

Electronic Device

Figure 1:
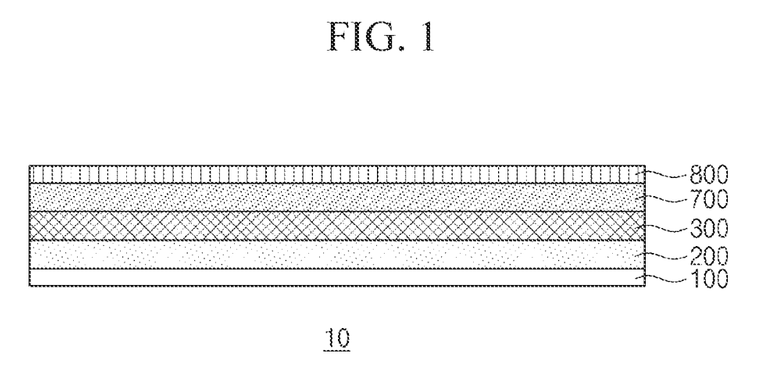
FIG. 1 is a cross-sectional view of an electronic device according to an example of the inventive concept.
Figure 2:
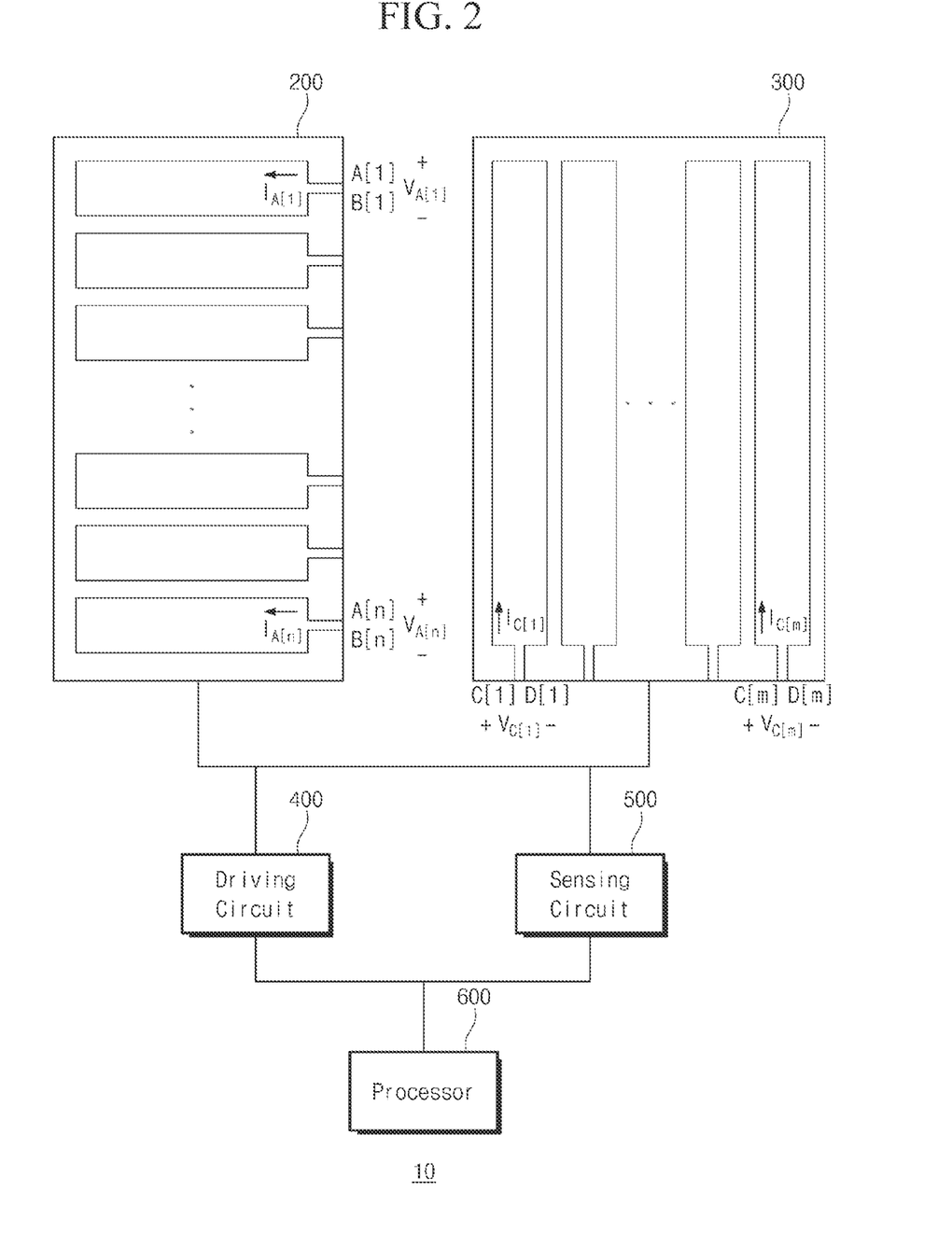
FIG. 2 is a view illustrating a configuration of an electronic device according to an example of the inventive concept.

FIG. 1 is a cross-sectional view of an electronic device according to an example of the inventive concept. FIG. 2 is a view illustrating a configuration of an electronic device according to an example of the inventive concept.

Referring to FIGS. 1 and 2, an electronic device 10 according to an example of the inventive concept includes a substrate 100, a first coil array 200, a second coil array 300, a driving circuit 400, a sensing circuit 500, a processor 600, a display substrate 700, and a cover film 800.

The substrate 100 may be formed of an insulating material such as glass, resin, or the like. In addition, the substrate 100 may be formed of a material having flexibility to enable the substrate 100 to be bent or foldable, and may have a single-layer structure or a multi-layer structure. In addition, the substrate 100 may have transparency through which light may pass.

The first coil array 200 is sequentially arranged on the substrate 100 in a first direction in a plan view and includes a plurality of first coils. The first direction may be a horizontal direction, that is, an X-axis direction as shown in FIG. 1, but this is only an example and the first direction of the inventive concept is not limited to the horizontal direction.

The second coil array 300 is spaced apart from and insulated from the first coil array 200, is sequentially arranged in a second direction or quasi-perpendicular to the first direction in a plan view, and includes a plurality of second coils.

The second coil array 300 may be spaced apart from the first coil array 200 on a different layer. In this case, that the second coil array 300 being located in a different layer means that the second coil array 300 may be located in an upper layer of the first coil array 200 as shown in FIG. 1, or different from FIG. 1, may be located in a lower layer of the first coil array 200. Alternatively, the second coil array 300 may be located on the same layer as the first coil array 200 while electrically spaced apart from the first coil array.

The second direction may be a vertical direction, that is, a Y-axis direction as shown in FIG. 1, but this is only an example and the second direction is not limited to the vertical direction in the inventive concept.

The first coil array 200 and the second coil array 300 may be electrically connected to the driving circuit 400 and/or the sensing circuit 500. For example, the first coil array 200 and/or the second coil array 300 may receive a driving signal from the driving circuit 400 and apply a magnetic field corresponding to the applied driving signal to a stylus 20. The first coil array 200 and/or the second coil array 300 may receive a response signal in the form of a magnetic field from the stylus 20.

Each of the plurality of first coils included in the first coil array 200 and the plurality of second coils included in the second coil array 300 may have both ends electrically connected to the driving circuit 400 or the sensing circuit 500.

For example, the plurality of first coils and the plurality of second coils may have at least one number of turns, and the number of turns may be one or more than two.

For example, either end of both ends of each of the plurality of first coils and the plurality of second coils may be connected to the ground GND.

For example, at least one end of both ends of each of the plurality of first coils and the plurality of second coils may be connected to a layer other than the layer in which each of the plurality of first coils and the plurality of second coils is located.

The driving circuit 400 applies the driving signal to at least one of the first coil array 200 and the second coil array 300 based on the control of the processor 600. For example, the driving circuit 400 may be connected to only one of the first coil array 200 and the second coil array 300 to apply the driving signal based on the control of the processor 600.

The sensing circuit 500 senses a response signal from the other coil array, not the one to which the driving circuit 400 is connected among the first and second coil arrays 200 and 300 under the control of the processor 600.

Each of the driving circuit 400 and the sensing circuit 500 may include a separate switching unit (not shown) in order to be selectively connected to the first coil array 200 and the second coil array 300.

Alternatively, a separate switching circuit (not shown) may be provided between the driving circuit 400 and the sensing circuit 500. The switching circuit (not shown) may be electrically connected to the processor 600 such that the driving circuit 400 and the sensing circuit 500 are connected to one of the first coil array 200 and the second coil array 300, respectively, based on the control of the processor 600.

The processor 600 is electrically connected to the driving circuit 400 and the sensing circuit 500 to control the driving circuit 400 and the sensing circuit 500. For example, the processor 600 may control the driving circuit 400 and the sensing circuit 500 to be electrically connected to the first coil array 200 and the second coil array 300, respectively, may apply a driving signal, may sense a response signal, or may identify a contact position of the stylus 20 based on the response signal. For example, the processor 600 applies a driving signal to each of a plurality of coils included in one of the first coil array 200 and the second coil array 300 at different time points, and identify, as a contact position, at least one of a plurality of positions corresponding to coils included a remaining coil array and coils included in the one coil array based on the different time points. The detailed operation of the processor 600 will be described below.

The display substrate 700 may be provided on the first coil array 200 and the second coil array 300, and may display text, images, pictures, and the like by a display driving circuit (not shown) electrically connected to the display substrate 700.

The cover film 800 is provided on the display substrate 700 and is in contact with the stylus 20. For example, the cover film 800 may protect the electronic device 10 from an external environment by forming an organic layer and/or an inorganic layer.

In this case, a touch screen panel (not shown) may be additionally provided between the display substrate 700 and the cover film 800. The touch screen panel (not shown) may be additionally provided on the display substrate 700 to identify an object (e.g., a human finger, or the like) other than the stylus 20.

Hereinafter, the operation of the processor 600 will be described in detail with reference to FIGS. 3 to 6.

Figure 3:
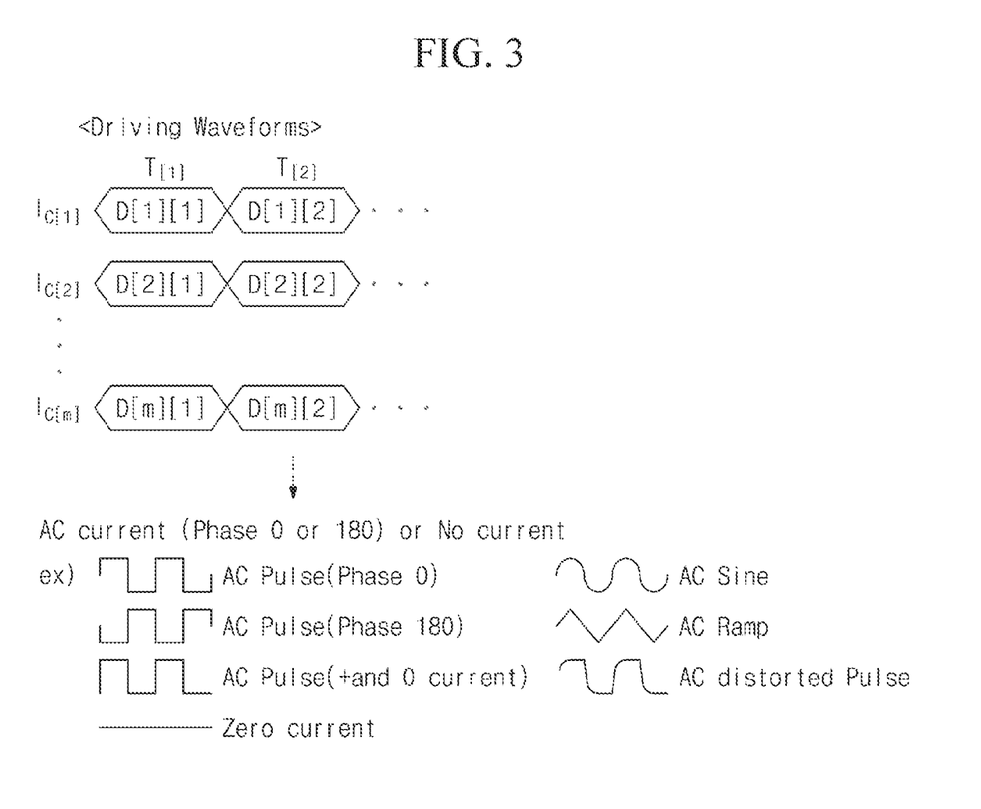
FIG. 3 is a view illustrating a driving signal according to an example of the inventive concept.
Figure 4:
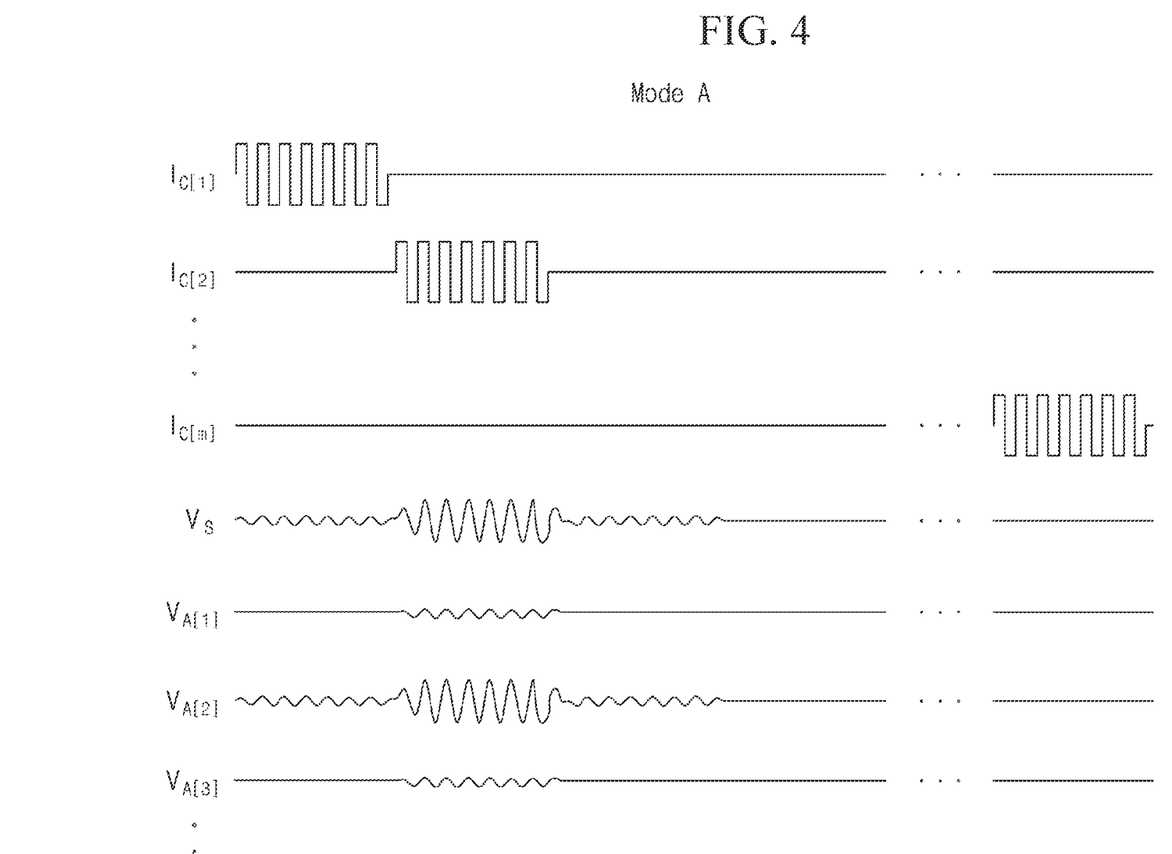
FIGS. 4 to 6 are views illustrating a mode of a processor according to various examples of the inventive concept.
Figure 5:
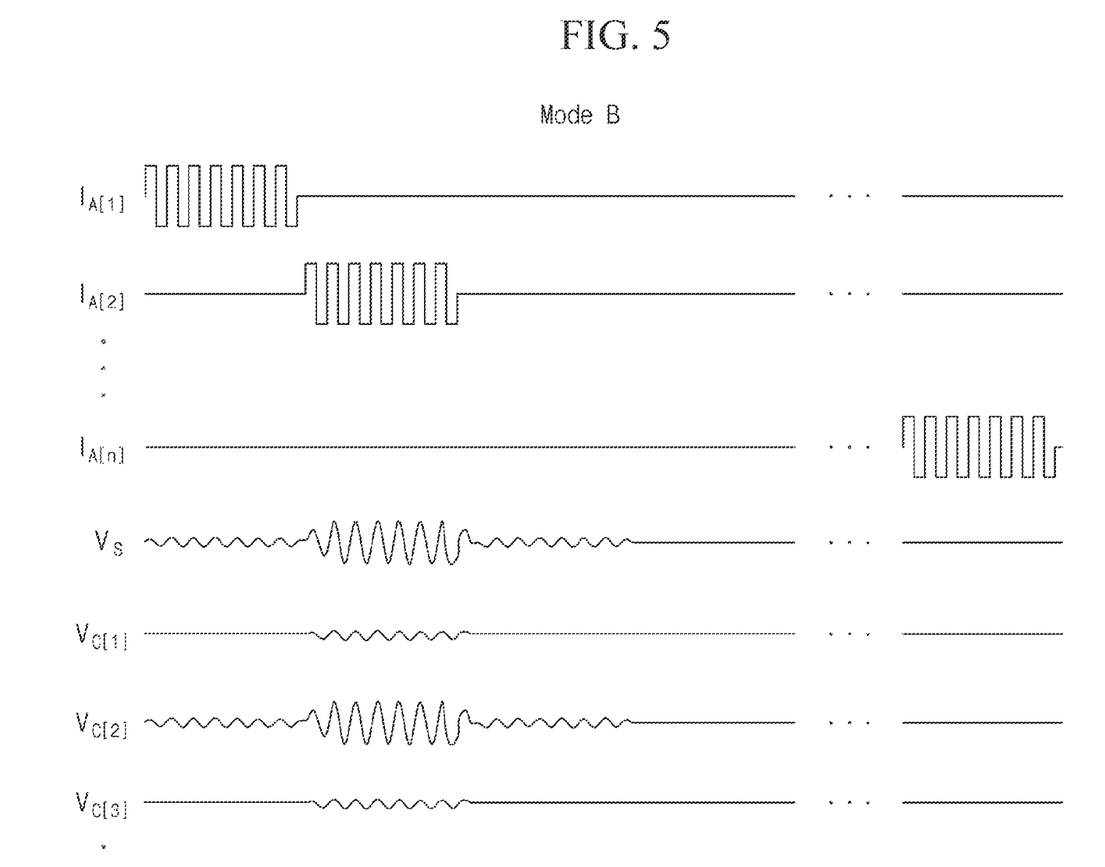
Figure 6:
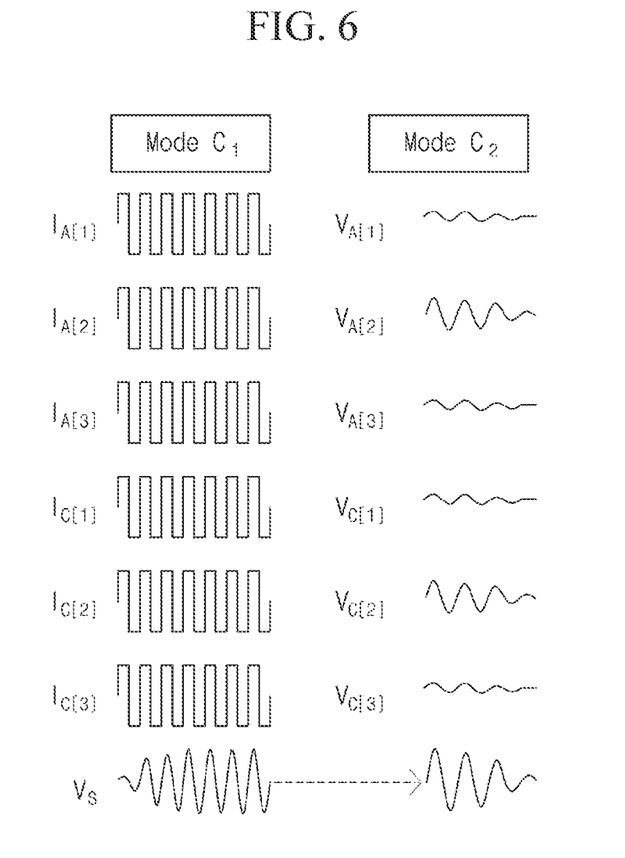

FIG. 3 is a view illustrating a driving signal according to an example of the inventive concept. FIGS. 4 to 6 are views illustrating a mode of a processor according to various examples of the inventive concept.

Referring to FIG. 3, the processor 600 may apply a driving signal to the first coil array 200 and the second coil array 300 based on a matrix. Each element of the matrix may be defined as D[x][y], and may be expressed as a phase and magnitude of a driving signal. For example, 'x' may be an order/index in which coils included in each of the plurality of first coil arrays 200 or the plurality of second coil arrays 300 are arranged, and 'y' may be a specific time period for which a signal is applied. Each element of the matrix may be any one of 1, 0 or −1. For example, 1, 0 and −1 may correspond to a signal having a phase of 0, a signal having an amplitude of 0, and a signal having a phase of 180 degrees, respectively.

The driving signal applied by the matrix may have various waveforms such as a pulse, a sine, a ramp, and the like, and may have various amplitudes or phases.

Referring to FIG. 4, when a driving signal (e.g., $I_{C[1]}$ to $I_{C[m]}$, where 'm' is the number of first coils) is applied, the processor 600 may apply the driving signal to one of the first coil array 200 and the second coil array 300. For example, in predefined mode "A", the processor 600 controls the first coil array 200 to be connected to the driving circuit 400 and applies the driving signal to the first coil array 200.

In addition, the processor 600 controls the sensing circuit 500 to be connected to the second coil array 300 at the same time as the application of the driving signal in mode "A", and senses a response signal (e.g., $V_{A[1]}$, or the like) corresponding to the driving signal from the second coil array 300 to identify the contact position of the stylus 20 based on the response signal. For example, the contact position may be a position where a coil corresponding to $V_{A[2]}$ at which the response signal is sensed and a coil to which a driving signal $I_{C[2]}$ corresponding to $V_{A[2]}$ is applied cross each other.

In mode "A", the processor 600 may perform an operation of controlling the first coil array 200 to be connected to the driving circuit 400 to apply the driving signal to the first coil array 200, and an operation of controlling the sensing circuit 500 to be connected to the second coil array 300 to sense the response signal corresponding to the driving signal from the second coil array 300 simultaneously during the driving period. In this case, the driving period may be a time period from a time point at which the driving signal is applied to a time point at which the application ends when a driving signal is sequentially applied to a plurality of coils included in the coil array connected to the driving circuit 400.

Referring to FIG. 5, in predefined mode "B", the processor 600 controls the second coil array 300 to be connected to the driving circuit 400, and applies the driving signal (e.g., $I_{A[1]}$ to $I_{A[n]}$, where n is the number of second coils) to the second coil array 300.

In addition, in mode "B", the processor 600 controls the sensing circuit 500 to be connected to the first coil array 200 at the same time as the application of the driving signal, and senses the response signal (e.g., $V_{C[1]}$ and the like) from the first coil array 200 to identify the contact position of the stylus 20 based on the response signal. For example, the contact position may be a position where a coil corresponding to $V_{C[2]}$ at which the response signal is sensed and a coil to which the driving signal $I_{A[2]}$ corresponding to $V_{C[2]}$ is applied cross each other.

In mode "B", the processor 600 may perform an operation of controlling the second coil array 300 to be connected to the driving circuit 400 to apply the driving signal to the second coil array 300, and an operation of controlling the sensing circuit 500 to be connected to the first coil array 200 to sense the response signal corresponding to the driving signal from the first coil array 200 simultaneously during the driving period.

Referring to FIG. 6, in predefined mode "C", the processor 600 may drive some of the plurality of first coils and the plurality of second coils (e.g., a coil corresponding to the contact position of the stylus 20) to identify the resonant frequency. The processor 600 may perform an operation included in mode "C" during a resonance period located after the driving period in the time domain. That is, the mode "C" may be maintained only during the resonance period. The mode "C" may include mode C1 and mode C2.

In mode C1, the processor 600 may control the driving circuit 400 to be connected to at least one coil corresponding to the identified contact position among the plurality of first coils and the plurality of second coils, and may apply a driving signal.

In mode C2, the processor 600 may control the sensing circuit 500 to be connected to at least one coil corresponding to the contact position, and may sense the response signal (e.g., $V_{A[2]}$ and $V_{C[2]}$) from at least one coil to identify the resonance frequency of the stylus 20.

In mode "A" and mode "B", the processor 600 may apply the driving signal by connecting one of the first coil array 200 and the second coil array 300 to the driving circuit 400, and at the same time, may perform an operation of sensing the response signal by connecting the other coil array to the sensing circuit 500. In addition, in mode "C" described above, the processor 600 may identify the resonance frequency in the resonance period other than the driving period in mode "A" and mode "B".

Figure 7:
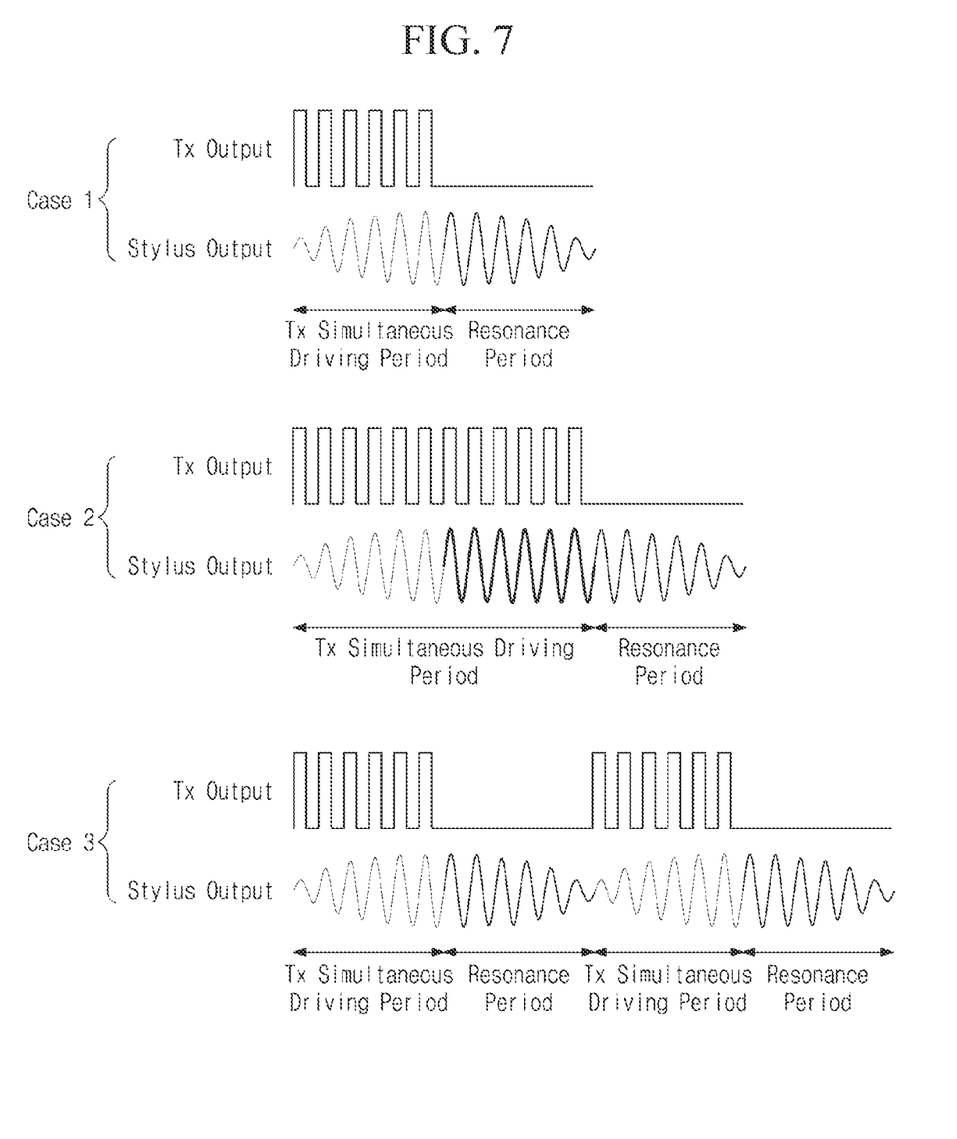
FIG. 7 is a view illustrating waveforms for various cases when an electronic device is driven according to an example of the inventive concept.

FIG. 7 is a view illustrating waveforms for various cases when an electronic device is driven according to an example of the inventive concept.

Referring to FIG. 7, when comparing cases 1 and 2, in the electronic device 10 according to the inventive concept, when the output of the stylus 20 is sufficiently saturated, even if the output of Tx (coil to which the driving signal is applied) becomes longer, the resonance period may not become longer. In addition, when comparing cases 1 and 2, even when the output of Tx is attenuated in the resonance period, the maximum output amplitude may be maintained from the output saturation time point of the stylus 20 during the Tx simultaneous driving period. In addition, when comparing cases 2 and 3, when the electronic device 10 according to the inventive concept desires to secure the same sensing time, the time required for using the Tx simultaneous driving period may be shorter.

Therefore, unlike the conventional stylus 20 that identifies the contact position of the stylus 20 in the EMR resonance period, when identifying the contact position of the stylus 200, the electronic device 10 according to the inventive concept described above may perform the operation of identifying the contact position at the same time as the driving signal is applied during the driving period. In this case, the resonance period may be maintained regardless of the Tx output, so that the touch sensitivity may be improved, the Tx output may maintain the maximum amplitude, and the time required when using the Tx simultaneous driving period may be short.

In addition, because the electronic device 10 does not use the active stylus 20, a battery is not required, and touch sensitivity may be improved by the above-described operations.

Hereinafter, a touch system including the electronic device 10 according to various examples of the inventive concept described above will be described. Hereinafter, a detailed description of the parts overlapping with the previously described parts will be omitted.

Touch System

Figure 8:
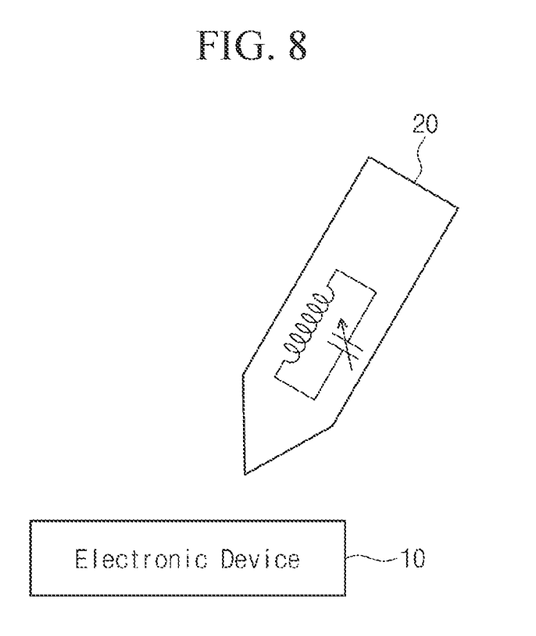
FIG. 8 is a view illustrating a configuration of a touch system according to an example of the inventive concept.

FIG. 8 is a view illustrating a configuration of a touch system according to an example of the inventive concept.

Referring to FIG. 8, a touch system according to an example of the inventive concept includes the electronic device 10 and the stylus 20.

The electronic device 10 includes the substrate 100, the first coil array 200 sequentially arranged on the substrate 100 in the first direction in a plan view, the second coil array 300 that is spaced apart from and insulated from the plurality of first coils and sequentially arranged in the second direction perpendicular or quasi-perpendicular to the first direction in a plan view, the driving circuit 400 that applies a driving signal to at least one of the first coil array 200 and the second coil array 300, the sensing circuit 500 that senses a response signal corresponding to the driving signal from at least one of the first coil array 200 and the second coil array 300, and the processor 600 that is electrically connected to the driving circuit 400 and the sensing circuit 500 to control the driving circuit 400 and the sensing circuit 500.

In this case, the processor 600 may control the driving circuit 400 to be connected to one of the first coil array 200 and the second coil array 300. The processor 600 may perform an operation of applying the driving signal to one coil array, an operation of controlling the sensing circuit 500 to be connected to the remaining coil array of the first coil array 200 and the second coil array 300 to sense the response signal corresponding to the driving signal from the remaining coil array, and an operation of identifying the contact position based on the response signal.

The stylus 20 makes contact with the surface (e.g., the cover film 800) of the electronic device 10, and the contact position is identified by the electronic device 10. For example, the stylus 20 may be a passive stylus 20. The stylus 20 includes an LC resonance unit (not shown) and an output unit (not shown).

The LC resonance unit (not shown) includes at least one variable capacitor and a coil. For example, the LC resonance unit (not shown) may be expressed as an LC parallel equivalent circuit. The LC resonance unit (not shown) may have a variable LC resonance frequency according to the variable capacitor. In detail, the variable capacitor may exhibit different capacitance values according to a change in pressure when the stylus 20 makes contact with the electronic device 10.

The LC resonance unit (not shown) may receive the driving signal from the electronic device 10 and transmit the response signal to the driving signal to the electronic device 10 through an output unit (not shown).

Hereinafter, a method of driving the above-described electronic device 10 will be described.

Method of Driving Electronic Device

Figure 9:
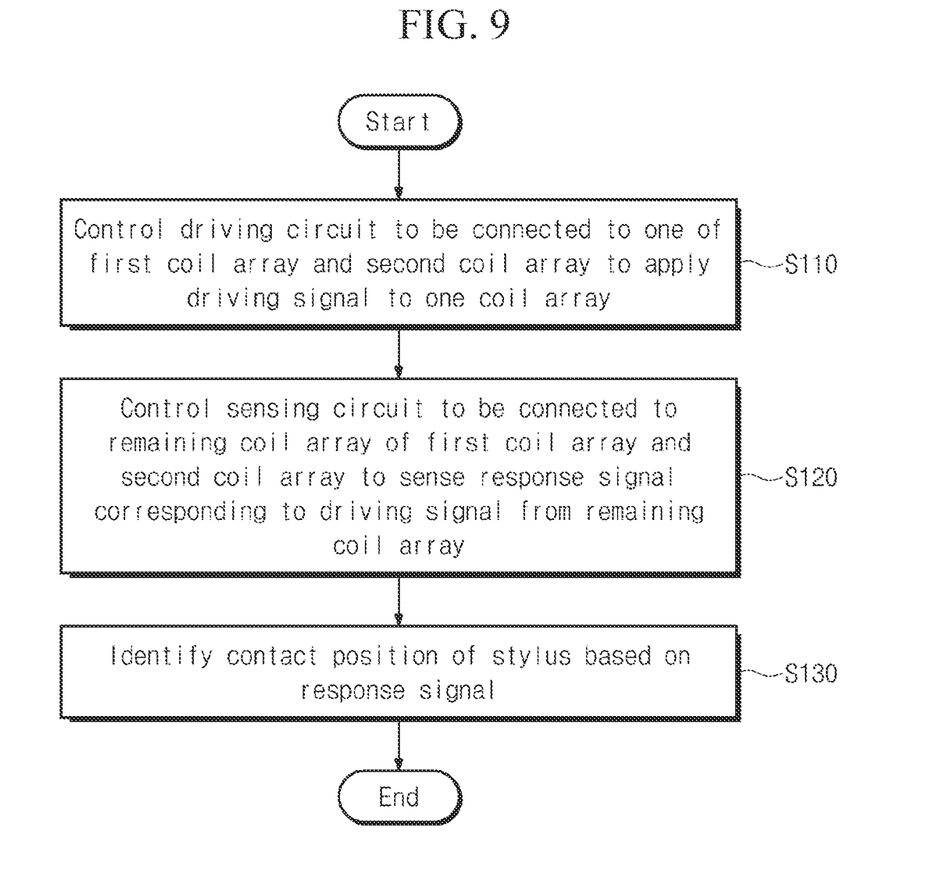
FIG. 9 is a flowchart illustrating a method of driving an electronic device according to an example of the inventive concept.

FIG. 9 is a flowchart illustrating a method of driving an electronic device according to an example of the inventive concept.

Referring to FIG. 9, in operation S110, the processor 600 controls the driving circuit 400 to be connected to one of the first coil array 200 and the second coil array 300 to apply the driving signal to one coil array. The driving signal is sequentially applied to the coils in the coil array based on the matrix. The operation S110 may be performed during the driving period.

In operation S120, the processor 600 controls the sensing circuit 500 to be connected to the other one of the first coil array 200 and the second coil array 300 to sense the response signal corresponding to the driving signal from the other coil array. The operation S120 may be performed together with the operation S110 during the driving period.

In operation S130, the processor 600 identifies the contact position of the stylus 20 based on the response signal.

The above-described operations S110 to S130 may be performed in mode "A" and mode "B".

Figure 10:
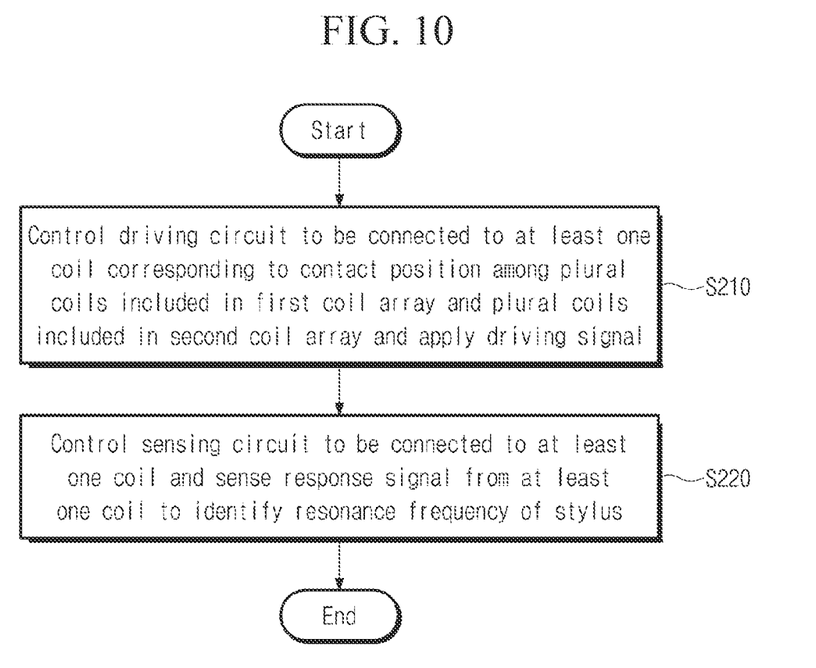
FIG. 10 is a flowchart illustrating an operation of identifying a resonance frequency by an electronic device according to an example of the inventive concept.

FIG. 10 is a flowchart illustrating an operation of identifying a resonance frequency by an electronic device according to an example of the inventive concept.

Referring to FIG. 10, in operation S210, the processor 600 controls the driving circuit 400 to be connected to at least one coil that corresponds to the contact position among the plurality of first coils included in the first coil array 200 and the plurality of second coils included in the second coil array 300, and applies the driving signal.

In operation S220, the processor 600 controls the sensing circuit 500 to be connected to at least one coil, and senses a response signal from the at least one coil to identify the resonant frequency of the stylus 20.

The above-described operations S210 to S220 may be performed in mode "C". In addition, operations S210 to S220 may be performed during a resonance period after the driving period in the time domain.

According to various examples of the inventive concept, there may be provided an electronic device for identifying a touch location using a passive stylus and having improved touch sensitivity without requiring a battery, a touch system including the electronic device, and an operation method thereof.

In addition, according to the electronic device for identifying a touch position, the touch system including the electronic device, and the operation method thereof of the inventive concept, an operation of identifying the contact position may be performed simultaneously with the application of the driving signal during the driving period. In this case, the resonance period may be maintained regardless of the Tx output, so that the touch sensitivity may be improved, the Tx output may maintain the maximum amplitude, and the time required for using the Tx simultaneous driving period may be short.

In addition, effects obtained by the inventive concept may not be limited to the above, and other effects will be clearly understandable to those having ordinary skill in the art from the detailed description.

Examples of the above-described proposed methods may be included as one of methods implemented by the inventive concept, and thus, it is obvious that they may be considered as a kind of proposed methods. In addition, the above-described proposed methods may be implemented independently or may be implemented in a combination (or integration) of some proposed methods As described above, the examples of the inventive concept are provided to be implemented by those skilled in the art. While the inventive concept has been described with reference to examples thereof, it will be apparent to those skilled in the art that the examples may be variously modified and changed. Therefore, the inventive concept is non-limited by the examples disclosed herein but intends to give a broadest scope matching the principles and new features disclosed herein.

What is claimed is:

1. An electronic device comprising:
a substrate;
a first coil array sequentially arranged on the substrate in a first direction in a plan view;
a second coil array spaced apart from the first coil array to be insulated and sequentially arranged in a second direction perpendicular or quasi-perpendicular to the first direction in the plan view;
a driving circuit configured to apply a driving signal to one of the first coil array and the second coil array;
a sensing circuit configured to sense a response signal corresponding to the driving signal from a remaining coil array;
a display substrate provided on the first coil array and the second coil array and including a display area connected to a display driving circuit to display images; and
a processor electrically connected to the driving circuit and the sensing circuit to control the driving circuit and the sensing circuit,
wherein the first coil array and the second coil array apply a magnetic field based on the driving signal,
wherein the processor is configured to perform:
(a) controlling the driving circuit to be connected to the one of the first coil array and the second coil array to apply the driving signal to the one of the first coil array and the second coil array;
(b) controlling the sensing circuit to be connected to the remaining one of the first coil array and the second coil array to sense the response signal corresponding to the driving signal from the remaining coil array; and
(c) identifying a contact position of a stylus based on the response signal, and
wherein the processor is further configured to simultaneously perform the identifying of the contact position of the stylus and the applying of the driving signal during a driving period which is followed by a resonance period in a time domain,
wherein the processor is configured to perform:
controlling the driving circuit to be connected to the first coil array to apply the driving signal to the first coil array and controlling the sensing circuit to be connected to the second coil array to sense the response signal simultaneously in a first mode, and
controlling the driving circuit to be connected to the second coil array to apply the driving signal to the second coil array and controlling the sensing circuit to be connected to the first coil array to sense the response signal simultaneously in a second mode.

2. The electronic device of claim 1, wherein the first coil array includes a plurality of first coils, and the second coil array includes a plurality of second coils, and
wherein the processor is configured to perform:
(d) controlling the driving circuit to be connected to at least one coil corresponding to the contact position among the plurality of first coils and the plurality of second coils and applying the driving signal; and
(e) controlling the sensing circuit to be connected to the at least one coil, and sensing the response signal from the at least one coil to identify a resonant frequency of the stylus.

3. The electronic device of claim 2, wherein the processor is configured to perform (d) the controlling the driving circuit and (e) the controlling the sensing circuit during the resonance period positioned after the driving period in a time domain.

4. The electronic device of claim 1, wherein the processor is configured to apply the driving signal to each of the plurality of coils included in one coil array at different times, and identify, as the contact position, at least one of a plurality of points corresponding to the plurality of coils included in the remaining one coil array and the plurality of coils included in the one coil array, based on the different time points.

5. The electronic device of claim 1, further comprising:
a cover film provided on the display substrate to be in contact with the stylus; and
a touch screen panel provided between the display substrate and the cover film and configured to identify an object including a human finger.

6. A touch system comprising:
a stylus; and
an electronic device configured to identify a contact position of the stylus, wherein the electronic device includes:
a substrate;
a first coil array sequentially arranged on the substrate in a first direction in a plan view;
a second coil array spaced apart from the first coil array to be insulated and sequentially arranged in a second direction perpendicular or quasi-perpendicular to the first direction in the plan view;
a driving circuit configured to apply a driving signal to one of the first coil array and the second coil array;
a sensing circuit configured to sense a response signal corresponding to the driving signal from a remaining one of the first coil array and the second coil array;
a display substrate provided on the first coil array and the second coil array and including a display area connected to a display driving circuit to display images; and
a processor electrically connected to the driving circuit and the sensing circuit to control the driving circuit and the sensing circuit,
wherein the first coil array and the second coil array apply a magnetic field based on the driving signal,
wherein the processor is configured to perform:
(a) controlling the driving circuit to be connected to one of the first coil array and the second coil array to apply the driving signal to the one of the first coil array and the second coil array;
(b) controlling the sensing circuit to be connected to the remaining one of the first coil array and the second coil array to sense the response signal corresponding to the driving signal from a remaining coil array; and
(c) identifying the contact position based on the response signal, and
wherein the processor is further configured to simultaneously perform the identifying of the contact position of the stylus and the applying of the driving signal during a driving period which is followed by a resonance period in a time domain,
wherein the processor is configured to perform:
controlling the driving circuit to be connected to the first coil array to apply the driving signal to the first coil array and controlling the sensing circuit to be connected to the second coil array to sense the response signal simultaneously in a first mode, and controlling the driving circuit to be connected to the second coil array to apply the driving signal to the second coil array and controlling the sensing circuit to be connected to the first coil array to sense the response signal simultaneously in a second mode.

7. A method which is performed by an electronic device including a substrate, a first coil array, a second coil array, a driving circuit, a sensing circuit, a display substrate provided on the first coil array and the second coil array and including a display area connected to a display driving circuit to display images; and a processor, the method comprising:
(a) controlling, by the processor, the driving circuit to be connected to one of the first coil array and the second coil array and applying a driving signal to the one coil array;
(b) controlling, by the processor, the sensing circuit to be connected to a remaining coil array of the first coil array and the second coil array to sense a response signal corresponding to the driving signal from the remaining coil array; and
(c) identifying, by the processor, a contact position of a stylus based on the response signal,
wherein the first coil array and the second coil array apply a magnetic field based on the driving signal,
wherein the processor is configured to simultaneously perform the identifying of the contact position of the stylus and the applying of the driving signal during a driving period which is followed by a resonance period in a time domain,
wherein the processor is configured to perform:
controlling the driving circuit to be connected to the first coil array to apply the driving signal to the first coil array and controlling the sensing circuit to be connected to the second coil array to sense the response signal simultaneously in a first mode, and
controlling the driving circuit to be connected to the second coil array to apply the driving signal to the second coil array and controlling the sensing circuit to be connected to the first coil array to sense the response signal simultaneously in a second mode.

8. The method of claim 7, further comprising:
(d) controlling, by the processor, the driving circuit to be connected to at least one coil corresponding to the contact position among a plurality of first coils included in the first coil array and a plurality of second coils included in the second coil array, and applying the driving signal; and
(e) controlling, by the processor, the sensing circuit to be connected to the at least one coil, and sensing the response signal from the at least one coil to identify a resonant frequency of the stylus.

9. The method of claim 8, wherein (d) controlling the driving circuit and (e) controlling the sensing circuit are performed during the resonance period positioned after the driving period in a time domain.

* * * * *